United States Patent [19]

Genma et al.

[11] Patent Number: 4,521,049
[45] Date of Patent: Jun. 4, 1985

[54] SMALL CAR BODY

[75] Inventors: Hideyuki Genma, Hamamatsu; Yoshiaki Sugita, Higashi Wakabayasi, both of Japan

[73] Assignee: Suzuki Motor Company Limited, Japan

[21] Appl. No.: 297,180

[22] Filed: Aug. 28, 1981

[30] Foreign Application Priority Data

Nov. 17, 1980 [JP] Japan .............................. 55-160775
Nov. 17, 1980 [JP] Japan .......................... 55-163471[U]
Nov. 28, 1980 [JP] Japan .............................. 55-166608

[51] Int. Cl.³ .............................................. B62D 27/00
[52] U.S. Cl. ..................................... 296/185; 280/666; 280/781; 296/205
[58] Field of Search ................. 296/35.3, 185, 197, 296/205; 280/788, 798, 663, 666, 668, 781, 790

[56] References Cited

U.S. PATENT DOCUMENTS 2,839,329  6/1958  Wilfert .................................. 280/798
3,560,016  2/1971  Bundorf ................................ 280/663

FOREIGN PATENT DOCUMENTS 1083218  1/1955  France ................................. 296/185
 763717 12/1956  United Kingdom ................. 296/185
1059556  2/1967  United Kingdom ................. 296/185

Primary Examiner—Joseph F. Peters, Jr.
Assistant Examiner—Ross Weaver
Attorney, Agent, or Firm—McGlew and Tuttle

[57] ABSTRACT

A small car body comprises a lower half part which is integrally molded of a synthetic resin, and a front panel, a roof panel and a roll bar panel which are jointed to the lower half part. The small car body includes a chassis frame in the lower half part which is provided with a front wheel suspension arrangement. The lower half part has a central indented area for accommodating seats and outwardly extending skirts for accommodating the chassis frame.

5 Claims, 10 Drawing Figures

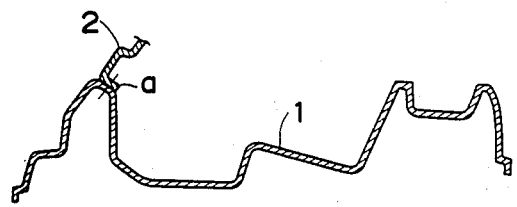
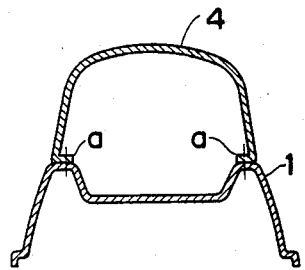
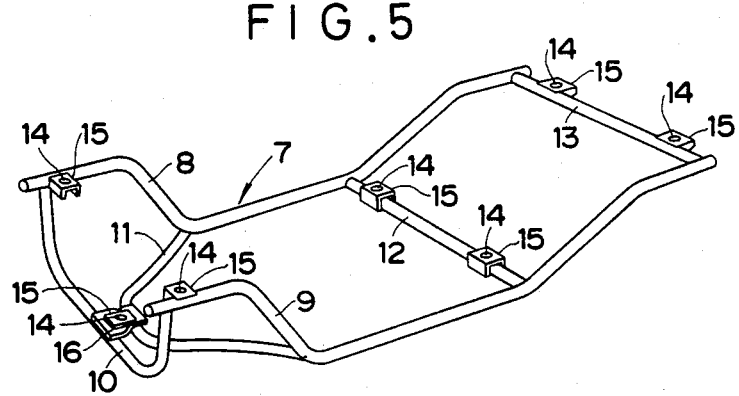
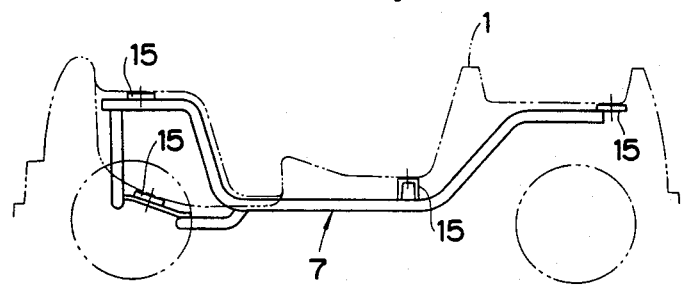

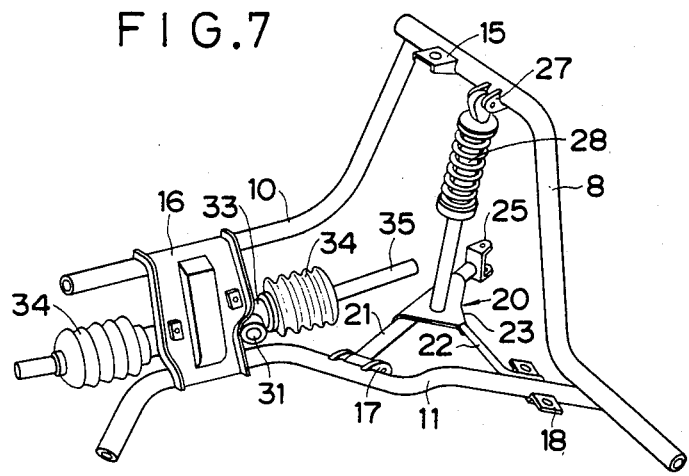
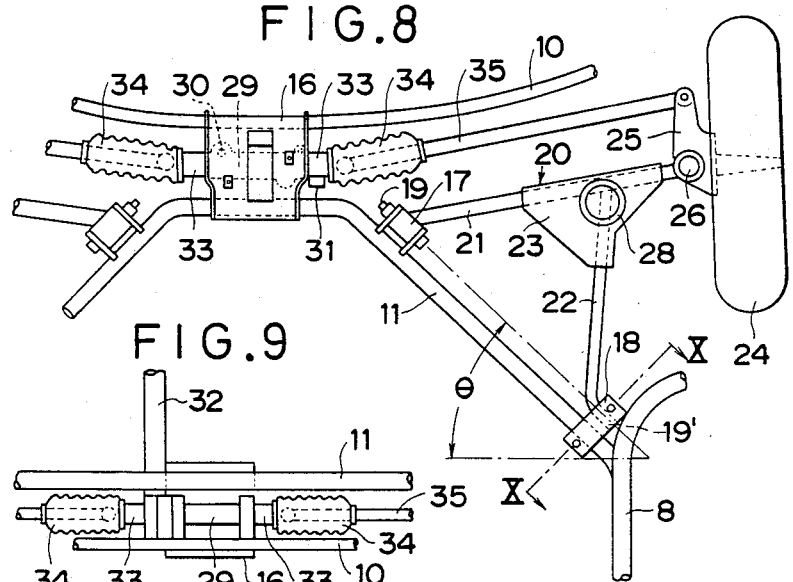
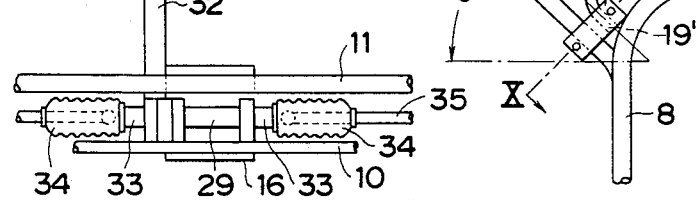
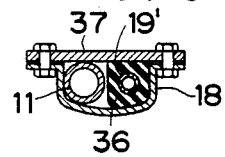

SMALL CAR BODY

FIELD AND BACKGROUND OF THE INVENTION

The present invention relates to a small car body structure which is highly rigid and which can be manufactured easily and economically. Further the invention relates to a front wheel suspension arrangement for the small car body structure wherein the frame is made to be simple and light and to provide a wide interior space.

Very small car designs are known which typically have a single occupant. Such cars are used mostly for local driving. It is desirable, from the standpoint of handling and fuel consumption, to make such cars as light in weight as possible. Such reduction in weight however also reduces rigidity and thus has an undesirable effect on safety. From the standpoint of manufacture and sale, it is desirable that the manufacture be easy and that variations be possible by utilizing interchangeable component parts. The small car should also be convenient to transport.

SUMMARY OF THE INVENTION

The present invention is made to meet the above mentioned various requirements. An object of the invention is to provide a small car body which can be integrally molded and which is highly rigid.

Another object of the present invention is to provide a small car body wherein component parts to be added onto the integrally molded body are either made of a resin or of thin iron plates and that the cost thereof is generally advantageous.

A further object of the present invention is to provide a small car body which has few component parts and is advantageous to manufacture.

A still further object of the present invention is to provide a small car body in which the shapes of component parts other than the molded body proper, can be easily changed.

A further object of the present invention is to provide a small car body wherein the general assembly can easily be made, the body proper and other parts can be separately transported and such transportation is very easy.

Another object of the present invention is to provide a small car body wherein the body proper is connected to a low part and a high part of the chassis frame so that the strength and rigidity of the frame may be widely shared with the body proper. Pipe members forming the chassis frame can be made small in diameter and the general weight and cost are reduced.

Another further object of the present invention is to provide a small car body having a front wheel suspension wherein a rack and pinion steering gear box is fitted to the front part of a plate-shaped bracket which connects first and second lateral pipes together at their respective middle portions. The lateral pipes form part of the frame. In this way no bracket which is solely for the gear box is required and a front wheel suspension which also increase a reinforcing effect for the frame is provided.

Another further object of the present invention is to provide a small car having front wheel suspension wherein the part of the above mentioned rack and pinion steering gear box is made straight so that the interior space of the car remains wide.

Therefore, according to the present invention, there is provided a small car body wherein the body proper forming the lower half part of the car, is integrally molded of a synthetic resin; and, a front panel, a roof panel and a roll bar panel are jointed above the body proper.

Further according to the present invention, there is provided a small car body wherein the above-mentioned body proper is mounted on the chassis frame at the underside thereof and the chassis frame is made low in the middle thereof and high in the front and rear portions thereof, to follow the contour of the body proper. Brackets are used for fitting the body proper in the middle low portion and front and rear high portions, to the chassis frame.

Further, according to the present invention, there is provided a small car having a front wheel suspension wherein two longitudinal pipes extend forwardly and rearwardly of the car body and are bent diagonally upwardly and then directed forwardly to form sides of the frame. These pipes are connected between their front ends and between the bases of their upwardly bent portions, in the lateral direction respectively, through the first and second lateral pipes. A suspension arm is fitted to and is directed outward from the above mentioned second lateral pipe and supports a front wheel. The above mentioned first and second lateral pipes are connected between their middle portions through a plate-shaped bracket, a rack and pinion steering gear box being fitted to this bracket. The rack and pinion steering gear box and the above mentioned front wheel are connected together through a rack assembly and a tie rod.

BRIEF DESCRIPTION OF THE DRAWINGS

In the drawings:

FIG. 3 is a sectional view on line III—III in FIG. 2;

FIG. 4 is a sectional view on line IV—IV in FIG. 2;

FIG. 5 is a perspective view of a chassis frame of a small car according to the present invention;

FIG. 6 is a side view showing connections between the chassis frame and the body;

FIG. 7 is a perspective view showing a front wheel suspension to be used for the small car according to the present invention;

FIG. 8 is a top plan view of FIG. 7;

FIG. 9 is a rear elevational view of part of the plate-shaped bracket shown in FIG. 7; and FIG. 10 is a sectional view taken on line X—X in FIG. 8.

DESCRIPTION OF THE PREFERRED EMBODIMENT

Figure 1:
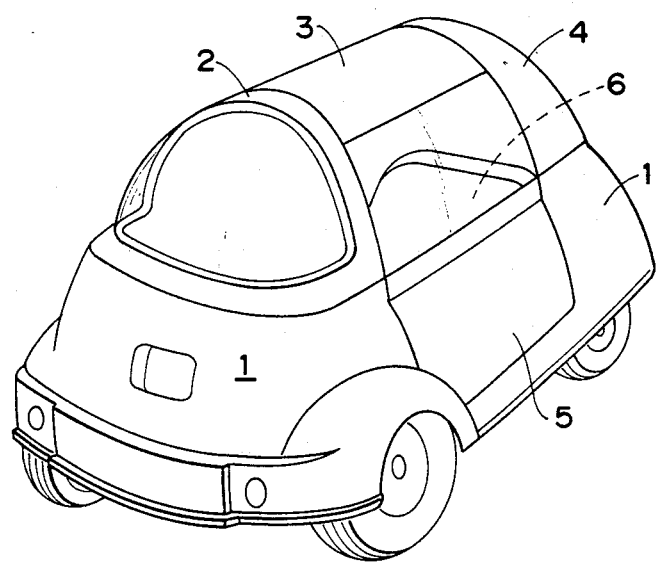
FIG. 1 is a perspective view of a small car according to the present invention.

FIG. 1 shows a completed small car according to the present invention. The reference numeral 1 denotes a lower body which is the lower half of the car, 2 denotes a front panel fitted above a front part of this body 1. A roof panel 3 is jointed to the front panel 2 at the front edge of roof panel 3 and a roll bar panel 4 is jointed to the roof panel 3 at the front edge of the roll bar panel. This roll bar panel 4 is jointed to the rear part of the body 1 at its lower edge. The reference numeral 5 denotes a door panel hinged to the body 1 and 6 denotes a seat part. The lower body 1 has a central indented area (for the seat 6 and a cargo area shown in FIG. 2) and outer downwardly extending skirts (FIG. 3) spaced from the indented area.

The body 1 is integrally molded of a synthetic resin but, as required, the outer peripheral part and such inner peripheral part as the seat part 6 may be separately molded and jointed together.

Figure 2:
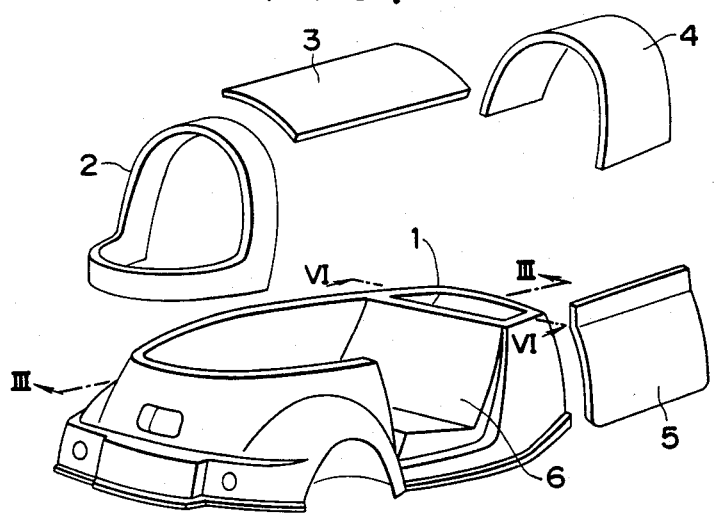
FIG. 2 is a partial exploded view showing the small car of FIG. 1 disassembled.

FIG. 2 shows these respective parts in their disassembled state. The thus separately molded front panel 2, roof panel 3, roll bar panel 4 and door panel 5 are jointed to the body 1 with rivets, tapping screws, bolts or bonding, at the edges a as shown in FIGS. 3 and 4.

FIG. 5 shows a chassis frame 7. This chassis frame is formed by placing two longitudinal pipes or members 8 and 9, made low in the middle and high at the front and rear ends, parallel to each other in the longitudinal direction. Longitudinal pipes 8 and 9 are connected together by first, second, third and fourth lateral pipes or members 10, 11, 12 and 13. The first lateral pipe 10 is in the form of a channel opening upwardly and is secured at both ends to pipes 8 and 9 near the front ends of the longitudinal pipes 8 and 9. The second lateral pipe 11 has a bend in plan view, and is fitted to the middle low portions of the longitudinal pipes 8 and 9. The third and fourth lateral pipes 12 and 13 are straight and are fitted at both ends to the middle portions and rear portions of the longitudinal pipes 8 and 9, respectively.

As shown in FIG. 5, brackets 15 for connecting the body, are fitted to the middle low portion and front and rear high portions of the chassis frame 7. Each bracket 15 is plate-shaped and has a screw hole 14 in it. FIG. 6 shows the body 1 fitted to the chassis frame 7. As seen in this view, the body 1 is fitted to the chassis frame 7 at the middle low portion and front and rear high portions.

FIGS. 7 to 10 show the arrangement of a front wheel suspension to be used for the body of the above mentioned small car.

A plate-shaped bracket 16 is provided between the above mentioned first lateral pipe 10 and second lateral pipe 11. Further, two brackets 17 and 18 are fitted at a proper spacing to the second lateral pipe 11. A suspension arm 20 is pivoted vertically rockably by shafts 19 and 19' (see FIG. 8) inserted respectively through these brackets 17 and 18. This suspension arm 20 is formed by connecting, in a T-shape form, two rods 21 and 22 through a plate 23. An axle member 25 of a front wheel 24 is pivoted by a shaft 26 to the extension of the rod 21. As shown in FIG. 8, an angle $\theta$ ($0° < \theta < 90°$) is provided between the extension line of the shafts 19 and 19' and the lateral width direction of the car body.

As shown in FIG. 7, a shock absorber 28 is fitted between a bracket 27 fitted near the front end of the longitudinal pipe 8 and the plate 23. The bracket 15 in front of the bracket 27 is the body mounting bracket to which the body is fitted in the front part.

A rack and pinion steering gear box 29 is fitted with a bolt 30 to the front part of the above mentioned plate-shaped bracket 16. The reference numeral 31 denotes a steering shaft fitting bracket to which a steering shaft 32 shown in FIG. 9 is fitted at the lower end thereof. A rack assembly 33 projects out of both sides of the rack and pinion steering gear box 29. The rack assembly 33 and the axle member 25 of the front wheel 24 are connected to each other through a universal joint 34 and tie rod 35.

FIG. 10 shows reference numeral 19' which designates the end of the rod 22 of the plate 23, to be fitted to the second lateral pipe 11 by using the bracket 18. The reference numeral 36 denotes an elastic member, such as one made of rubber, and 37 denotes a holding plate welded to the second lateral pipe 11.

Since this apparatus is formed as described above, even if the two longitudinal pipes and four lateral pipes are made of pipe materials, a sufficient strength will be obtained and the weight will be thereby greatly reduced. Further, since the rack and pinion steering gear box 29 is fitted to the plate-shaped bracket 16 connecting the first and second lateral pipes 10 and 11, so that a bracket solely for connecting purposes is not required, a reinforcing effect will be produced without the need for an extra bracket. Further, as this part is straight, there will be an effect that the interior space of car can be wide.

We claim:

1. A small car body comprising:
    a lower half part made of integrally molded synthetic resin and having a central indented area for accommodating a seat, and an outer downwardly extending skirt spaced from the indented area;
    a front panel connected to and extending upwardly from said lower half part at a location between said central indented area and said skirt;
    a roll bar panel connected to and extending above said lower half part at locations between said central indented area and said skirt;
    a roof panel connected between said front panel and said roll bar panel;
    a pair of laterally spaced longitudinal members each having low middle portions, a high front portion extending forwardly of said middle portion and a high rear portion extending rearwardly of said middle portion;
    a first lateral member having a lower middle part and opposite upwardly extending ends, each upwardly extending end connected to said front portion of one of said pair of longitudinal members;
    a second lateral member having a forward middle part and rearwardly extending ends, each rearwardly extending end connected to said low middle portion of one of said longitudinal members, at a forward location thereon;
    a bracket plate connected between said low middle part of said first lateral member and said forward middle part of said second lateral members;
    a third lateral member connected between said low middle portions of said longitudinal members at rear locations of said low middle portion;
    a fourth lateral member connected between said rear portions of said pair of longitudinal member;
    said pair of longitudinal, first, second third and fourth lateral members forming a chassis frame;
    a plurality of fixing brackets connected to said chassis frame and said lower half part for connecting said chassis frame to said lower half part; and
    suspension means for suspending a front tire between each rearwardly extending end of said second lateral member and each longitudinal member front portion respectively.

2. A small car body according to claim 1, wherein each of said longitudinal members and said lateral members comprises pipes.

3. A small car body according to claim 1, wherein said suspension means comprises a pair of suspension arms pivotally mounted to one of said rearwardly extending ends of said second lateral member, a support plate connected to said pair of suspension arms and shock absorber spring means connected between said support plate and one of said longitudinal member forward portions.

4. A small car body according to claim 1, including a rack and pinion steering gear box connected to said bracket plate and a tie rod connected between said gear box and each of said suspension means for steering tires connected to said suspension means.

5. A small car body according to claim 3, including a rack and pinion steering gear box connected to said bracket plate and a tie rod connected to said gear box and extending outwardly with one of said suspension arms for connection to a tire to be mounted on said one of said suspension arms.

* * * * *